(12) United States Patent
Kitamoto et al.

(10) Patent No.: US 9,971,651 B2
(45) Date of Patent: May 15, 2018

(54) ELECTRONIC DEVICE THAT ENSURES RECOVERY WITHOUT ENTIRE REBOOT, AND RECORDING MEDIUM

(71) Applicant: Kyocera Document Solutions Inc., Osaka (JP)

(72) Inventors: Daijiro Kitamoto, Osaka (JP); Tomonori Naota, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 22 days.

(21) Appl. No.: 15/140,503

(22) Filed: Apr. 28, 2016

(65) Prior Publication Data

US 2016/0321139 A1  Nov. 3, 2016

(30) Foreign Application Priority Data

Apr. 28, 2015 (JP) ................................. 2015-091226
Apr. 28, 2015 (JP) ................................. 2015-091227
Apr. 28, 2015 (JP) ................................. 2015-091232

(51) Int. Cl.
  *G06F 11/00* (2006.01)
  *G06F 11/14* (2006.01)
  *H04N 1/32* (2006.01)

(52) U.S. Cl.
  CPC .......... *G06F 11/1417* (2013.01); *G06F 11/00* (2013.01); *H04N 1/32609* (2013.01); *G06F 2201/805* (2013.01)

(58) Field of Classification Search
  CPC ........................ H04N 1/32609; G06F 11/1417
  See application file for complete search history.

(56) References Cited

U.S. PATENT DOCUMENTS

| | | | | |
|---|---|---|---|---|
| 4,745,602 A | * | 5/1988 | Morrell ............... | G06F 11/0733 714/2 |
| 4,866,712 A | * | 9/1989 | Chao ..................... | G06F 11/076 714/2 |
| 5,208,814 A | * | 5/1993 | Ulrich ................ | G03G 15/5012 714/2 |

(Continued)

FOREIGN PATENT DOCUMENTS

| | | |
|---|---|---|
| JP | 61-141047 A | 6/1986 |
| JP | 06-131082 A | 5/1994 |

(Continued)

*Primary Examiner* — Bryce P Bonzo
*Assistant Examiner* — Jonathan D Gibson
(74) *Attorney, Agent, or Firm* — James Judge

(57) ABSTRACT

An electronic device includes an application subsystem and a platform subsystem. The application subsystem includes one or more first independent processes that provide a user with different functions of the electronic device, a first process monitoring circuit that detects a handling-required state of the first independent process, and a system state managing circuit that reboots the first independent process in which the handling-required state has occurred. The first process monitoring circuit that has detected the handling-required state transmits an error notification to the system state managing circuit. The system state managing circuit that has received the error notification reboots the first independent process in the handling-required state.

9 Claims, 15 Drawing Sheets

(56) References Cited

U.S. PATENT DOCUMENTS

| | | | | |
|---|---|---|---|---|
| 5,620,264 | A * | 4/1997 | Kagita | G06K 15/00 400/703 |
| 8,799,452 | B2 * | 8/2014 | Takahashi | H04N 1/00344 709/223 |
| 9,218,152 | B2 * | 12/2015 | Hamano | G06F 3/1296 |
| 2003/0105995 | A1 * | 6/2003 | Schroath | G06K 15/00 714/48 |
| 2005/0179931 | A1 * | 8/2005 | Yamaguchi | G06F 11/0733 358/1.14 |
| 2008/0059836 | A1 * | 3/2008 | Fujii | H04N 1/32609 714/15 |
| 2008/0184076 | A1 * | 7/2008 | Yamazaki | G06F 11/30 714/47.1 |
| 2010/0058123 | A1 * | 3/2010 | Yamashirodani | G06F 11/0733 714/57 |
| 2014/0149568 | A1 * | 5/2014 | Kruempelmann | H04L 43/0817 709/224 |

FOREIGN PATENT DOCUMENTS

| | | |
|---|---|---|
| JP | H09-282192 A | 10/1997 |
| JP | H10-040123 A | 2/1998 |
| JP | 2002-149437 A | 5/2002 |
| JP | 2006-157386 A | 6/2006 |
| JP | 2013-011677 A | 1/2013 |

* cited by examiner

FIG. 15

| 18: Failure-handling table | | First recovery process | Second recovery process | Third recovery process | Fourth recovery process |
|---|---|---|---|---|---|
| Down process | Independent process 6a (Control of image reading unit) | Reboots | Reboots | Reboots | Stops control (Separates H/W) |
| | Independent process 6b (Control of image forming unit) | Reboots | Reboots | Stops control (Separates H/W) | — |
| | Independent process 6c (Control of storage unit) | Reboots | Stops control (Separates H/W) | — | — |

ELECTRONIC DEVICE THAT ENSURES RECOVERY WITHOUT ENTIRE REBOOT, AND RECORDING MEDIUM

INCORPORATION BY REFERENCE

This application is based upon, and claims the benefit of priority from, corresponding Japanese Patent Application Nos. 2015-091232, 2015-091226, and 2015-091227, each filed in the Japan Patent Office on Apr. 28, 2015, the entire contents of which are incorporated herein by reference.

BACKGROUND

Unless otherwise indicated herein, the description in this section is not prior art to the claims in this application and is not admitted to be prior art by inclusion in this section.

In case where a failure such as a system error occurs in a typical electronic device, a program (a process) in operation is rebooted (restarted) to recover the electronic device.

For situations where a failure occurs during the handling of a problem in which information for failure analysis obtained during the failure is cleared at reboot, provided is a technique of saving the information for failure analysis to another storage area before reboot.

Although not a technique related to processes during failure, there is provided the following technique. When an electronic device is suspended, to reduce the amount of data saved from a main storage, which is configured of a volatile memory, to an auxiliary storage, which is configured of a non-volatile memory, the main storage is divided into a plurality of blocks. The technique assigns attributes for each block to determine whether data is required to be saved or not. The technique saves to the auxiliary storage only the data in those blocks for which saving in auxiliary storage is required.

There is provided the following technique. The technique provides a monitoring application to monitor failure in a user application, which operates to achieve functions of an image forming apparatus. Depending on the level of a failure occurring in the user application, the monitoring application performs recovery processes for various stages. If the failure is one that recovers by a system reboot, the system is rebooted.

There is provided a technique where monitor software monitors an operating state of monitored software. The technique provides a counter to specify the number of reboots in case of failure. The technique sets the predetermined number of reboots in the counter and reboots the system.

SUMMARY

An electronic device according to one aspect of the disclosure includes an application subsystem and a platform subsystem. The application subsystem includes a first process monitoring circuit that detects a handling-required state of one or more first independent processes that provide a user with different functions of the electronic device, and a system state managing circuit that reboots a first independent process in which the handling-required state has occurred. The platform subsystem controls one or more hardwares of the electronic device. When the handling-required state occurs in one of the first independent processes, (i) the first process monitoring circuit that has detected the handling-required state transmits an error notification to the system state managing circuit and (ii) the system state managing circuit that has received the error notification reboots the first independent process in which the handling-required state has occurred.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 15 illustrates an example of a failure-handling table according to the third embodiment.

DETAILED DESCRIPTION

Figure 1:
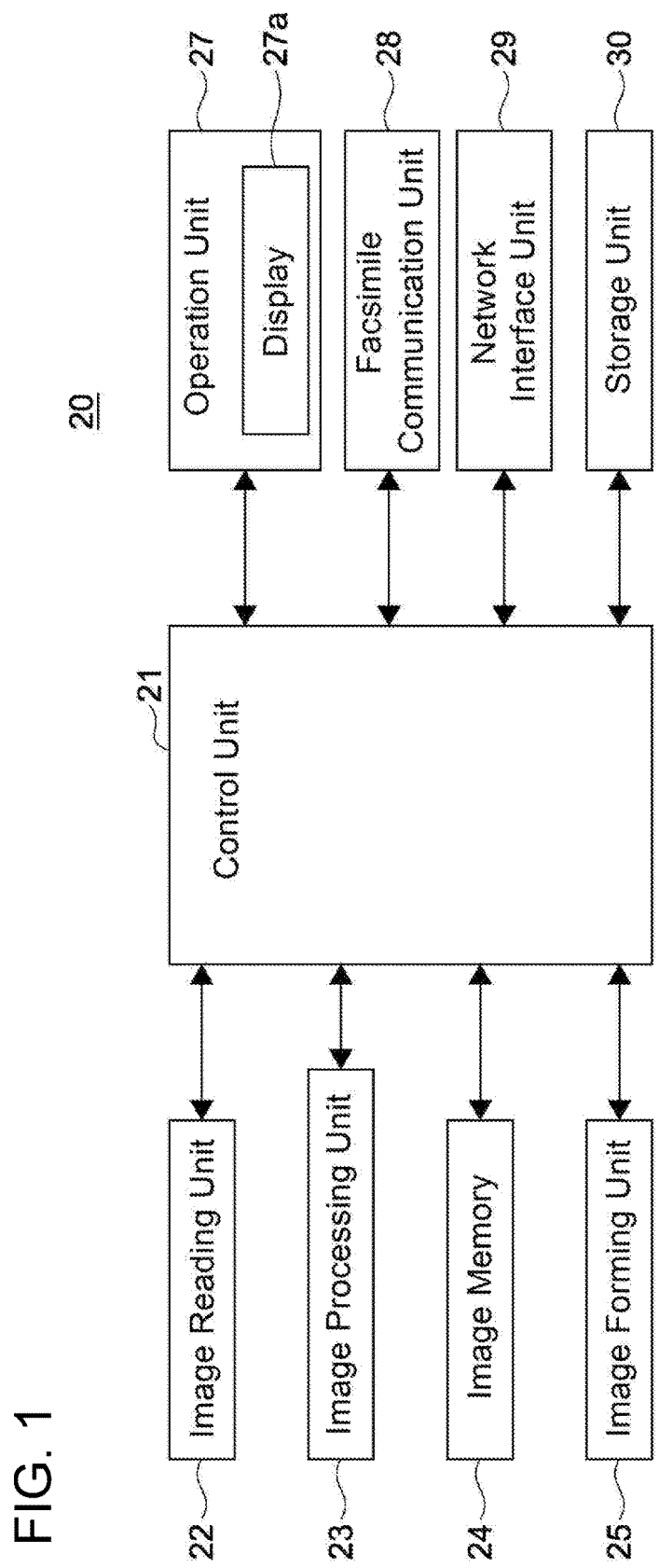
FIG. 1 schematically illustrates a configuration of an image forming apparatus according to a first embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes first to third embodiments of the disclosure with reference to the drawings. The following description describes an image forming apparatus (MFP) as an example of an electronic device.

Configuration of Image Forming Apparatus According to First Embodiment

First, the following describes the configuration of the image forming apparatus. FIG. 1 schematically illustrates a configuration of an image forming apparatus 20 according to the first embodiment of the disclosure.

The image forming apparatus 20 includes a control unit 21. The control unit 21 is configured with a central processing unit (CPU), a random access memory (RAM), a read only memory (ROM), a dedicated hardware circuit, and similar components. The control unit 21 manages the whole operation control of the image forming apparatus 20.

The control unit 21 is connected to an image reading unit 22, an image processing unit 23, an image memory 24, an image forming unit 25, an operation unit 27, a facsimile communication unit 28, a network interface unit 29, a storage unit 30, and a similar unit. The control unit 21 performs an operation control of the connected respective units and transmits and receives signals or data to/from the respective units.

The control unit 21 controls driving of mechanisms and processing necessary to perform the operation control on respective functions such as a scanner function, a printing function, a copy function, and a facsimile transmission/reception function in accordance with an execution instruction of a job input by a user via the operation unit 27, a personal computer (PC) connected over network, or a similar unit. The details of the control unit 21 will be described later.

The image reading unit 22 reads images from documents.

The image processing unit 23 performs an image process on image data of the image read by the image reading unit 22 as necessary. For example, the image processing unit 23 performs image processing such as shading correction to improve the quality of the image, which has been read by the image reading unit 22, after image formation.

The image memory 24 is an area that temporarily stores data of the document image obtained by reading by the image reading unit 22 or temporarily stores data to be printed by the image forming unit 25.

The image forming unit 25 performs image formation of the image data and similar data read by the image reading unit 22.

The operation unit 27 includes a touch panel unit and an operation key unit accepting an instruction from the user on various operations and processes that can be performed by the image forming apparatus 20. The touch panel unit includes a display 27a such as a liquid crystal display (LCD), which includes a touch panel.

The facsimile communication unit 28 includes an encoding/decoding unit, a modulation/demodulation unit, and a network control unit (NCU) (not illustrated). The facsimile communication unit 28 performs facsimile transmissions using a public telephone network.

The network interface unit 29 is configured of a communication module such as a local area network (LAN) board. The network interface unit 29 transmits and receives various data to/from a device in a local area (such as the PC) via the LAN or a similar medium connected to the network interface unit 29.

The storage unit 30, which is a large-capacity storage device such as a hard disk drive (HDD), has an area storing document images or a similar image read by the image reading unit 22.

The configuration of the image forming apparatus 20 is described above.

Configuration of Control Unit

Figure 2:
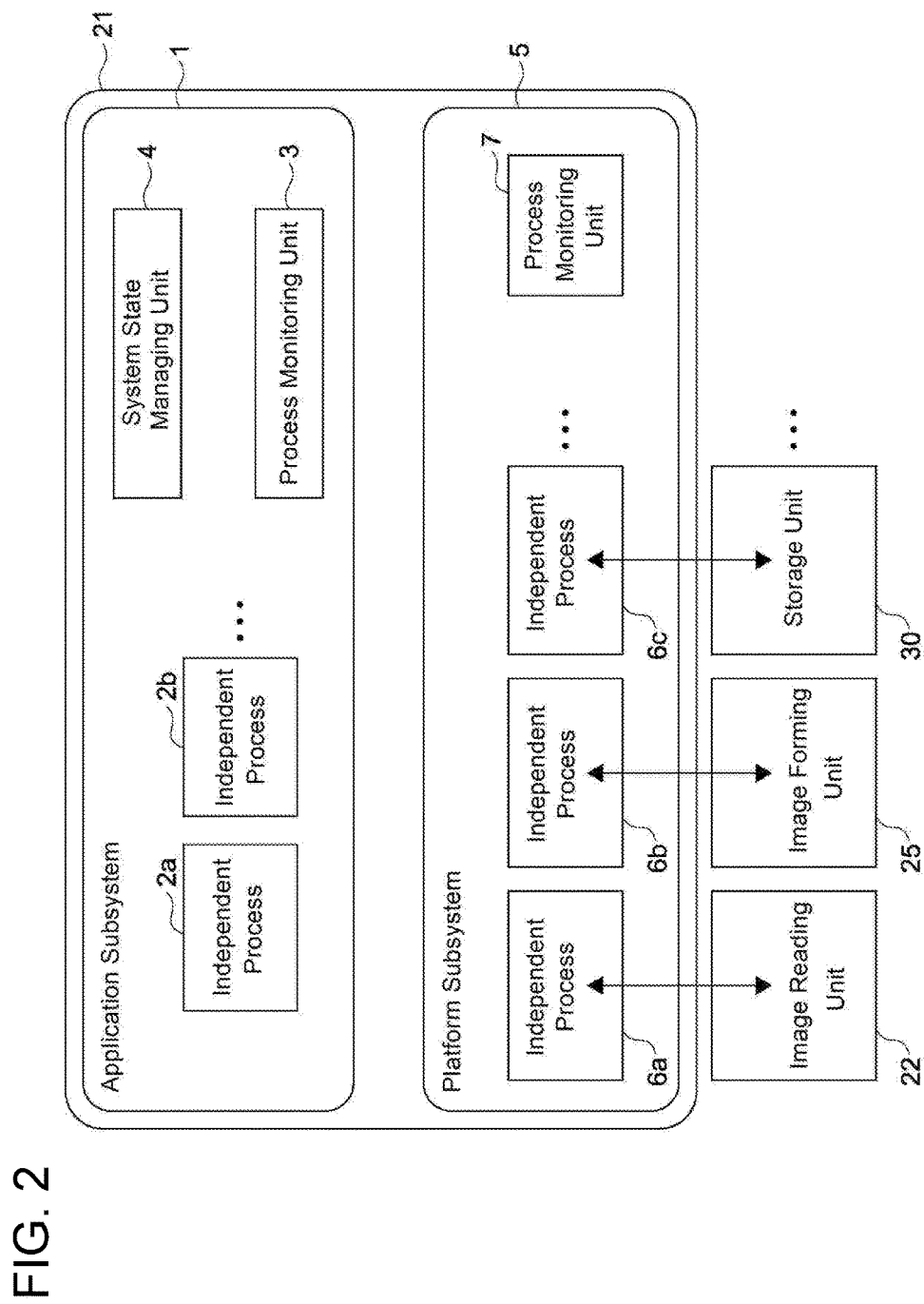
FIG. 2 illustrates a configuration of a control unit according to the first embodiment.

Next, the following describes the configuration of the control unit 21. FIG. 2 illustrates the configuration of the control unit 21 according to the first embodiment.

The control unit 21 is roughly divided into an application subsystem 1 and a platform subsystem 5.

The application subsystem 1 includes independent processes (first independent processes) 2a, 2b, and so on, which are independent depending on functions of the image forming apparatus 20, a process monitoring unit (a first process monitoring unit) (also referred to as a process monitoring circuit) 3, and a system state managing unit (also referred to as a system state managing circuit) 4. The process monitoring unit 3 and the system state managing unit 4 may include a processor including one or more circuits, can read and execute various programs, and can execute various programs preliminarily incorporated into the inside. Here, the circuit can be an electronic component where a plurality of electronic elements are connected with wiring or an electronic substrate.

The independent processes 2a, 2b, and so on correspond to application programs such as word-processing software and spreadsheet software in general PCs. The independent processes 2a, 2b, and so on are booted by the application subsystem 1 to operate. The operations of the independent processes 2a, 2b, and so on are controlled by the application subsystem 1.

The process monitoring unit 3 monitors operating states of the independent processes 2a, 2b, and so on operated in the application subsystem 1. For example, if a failure occurs in the independent process 2b and the independent process 2b goes down, the process monitoring unit 3 detects the process-down.

The system state managing unit 4 manages the current operating states of the respective independent processes in the control unit 21 and displays the operating states on the display 27a. The system state managing unit 4 reboots a process at which the process-down has occurred in the independent processes 2a, 2b, and so on in the application subsystem 1.

The platform subsystem 5 includes independent processes (second independent processes) 6a, 6b, 6c, and so on, which are independent depending on hardware to be controlled, and a process monitoring unit (a second process monitoring unit) 7. The process monitoring unit 7 may include a processor including one or more circuits, can read and execute various programs, and can execute various programs preliminarily incorporated into the inside. Here, the circuit can be an electronic component where a plurality of electronic elements are connected with wiring or an electronic substrate.

The independent processes 6a, 6b, 6c, and so on correspond to the respective units of the operating system (OS) in general PCs. The independent processes 6a, 6b, 6c, and so on are booted by the platform subsystem 5 to operate. The operations of the independent processes 6a, 6b, 6c, and so on are controlled by the platform subsystem 5.

The respective independent processes 2a, 2b, and so on in the application subsystem 1 use the independent processes 6a, 6b, 6c, and so on in the platform subsystem 5 to achieve functions instructed by the user.

The process monitoring unit 7 monitors the operating states of the independent processes 6a, 6b, 6c, and so on, which are operated in the platform subsystem 5.

For example, the independent process 6a controls the image reading unit 22, which is hardware. If a failure occurs in the image reading unit 22 and a failure occurs in the independent process 6a itself, the process monitoring unit 7 detects the failure as a failure in the independent process 6a.

The process monitoring unit 3 and the process monitoring unit 7 notify the process-down of the independent processes 2a, 2b, and so on in the application subsystem 1 and the process-down of the independent processes 6a, 6b, 6c, and so on in the platform subsystem 5 to one another for cooperation.

The configuration of the control unit 21 according to the first embodiment is described above.

Flow of Processes 1

Figure 3:
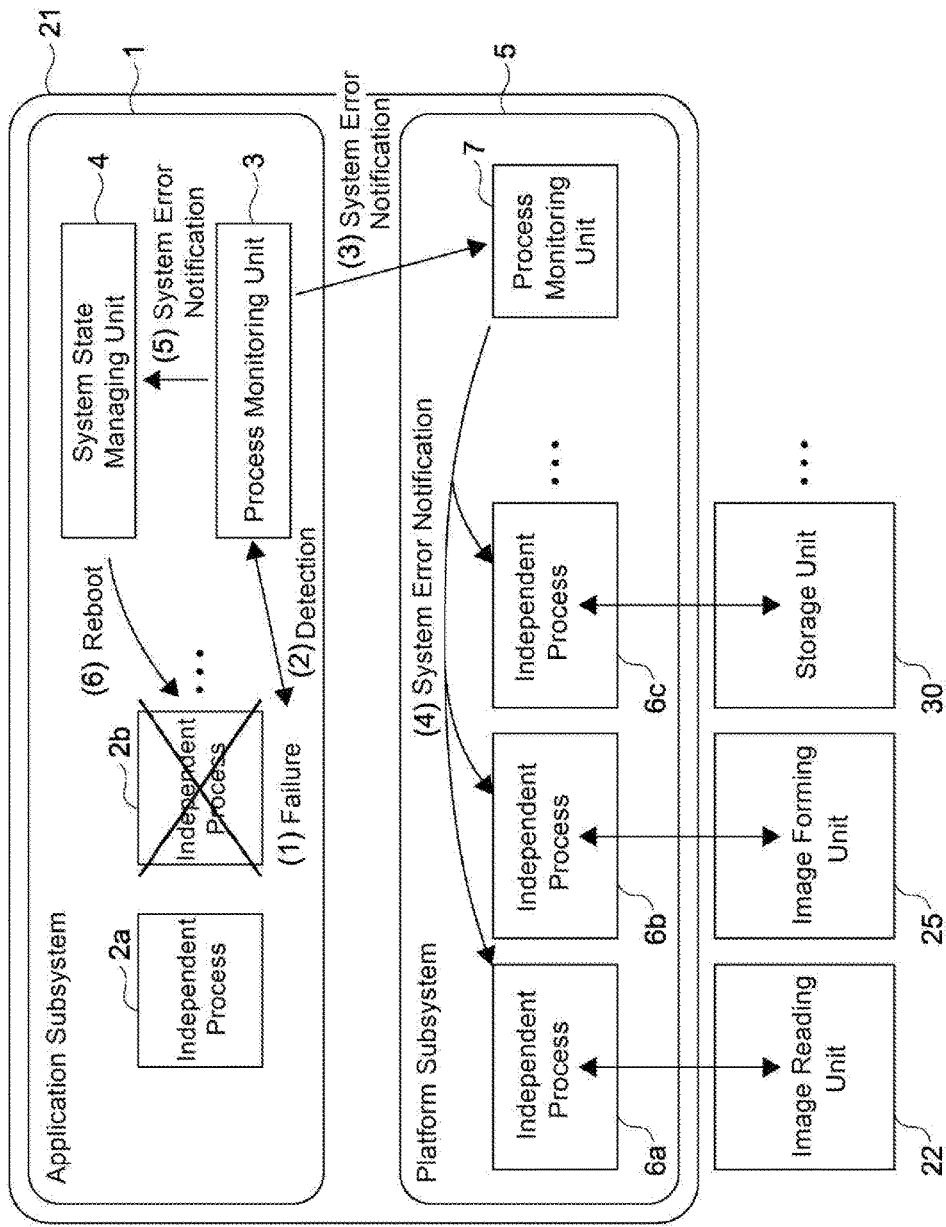
FIG. 3 illustrates a flow of a reboot process if a failure occurs in any of independent processes in an application subsystem according to the first embodiment.

Next, the following describes the flow of a reboot process if a failure occurs in any of the independent processes 2a, 2b, and so on in the application subsystem 1. FIG. 3 illustrates the flow of the reboot process if a failure occurs in any of the independent processes 2a, 2b, and so on in the application subsystem 1 according to the first embodiment.

(1) First, assume that a failure occurs in the independent process 2b in the application subsystem 1.

(2) Next, the process monitoring unit 3 detects the failure (the process-down) of the independent process 2b. A state that requires reboot or a similar operation such as a failure and a process-down is referred to as a handling-required state.

(3) Next, the process monitoring unit 3 transmits a system error notification (an error notification), which notifies the failure of the independent process 2b, to the process monitoring unit 7 in the platform subsystem 5.

(4) The process monitoring unit 7 transmits the system error notification, which notifies the failure of the independent process 2b, to the respective independent processes 6a, 6b, 6c, and so on in the platform subsystem 5.

The independent processes 6a, 6b, 6c, and so on, which have received the system error notification, refrain communications with the independent process 2b during a specific period until the reboot of the independent process 2b is completed. This ensures restraining errors due to a communication failure with the independent process 2b.

The configuration of the independent processes 6a, 6b, 6c, and so on that have received the system error notification refraining the communications with the independent process 2b may also be as follows, in addition to the configuration where the communications are refrained until an elapse of the specific period. Only after the notification of completion of reboot is received from the independent process 2b where the reboot has been completed, the communications with the independent process 2b are resumed.

(5) Next, the process monitoring unit 3 transmits the system error notification, which notifies the failure in the independent process 2b, to the system state managing unit 4.

(6) Next, the system state managing unit 4 reboots the independent process 2b based on the received system error notification. Since the system state managing unit 4 is in the application subsystem 1 together with the independent process 2b in which the failure has occurred, the system state managing unit 4 can easily perform the reboot process.

The system error notification from the process monitoring unit 3 is not limited to the above-described order. The system error notification may be performed simultaneously on the process monitoring unit 3 and the process monitoring unit 7 or may be transmitted first to any of the process monitoring unit 3 and the process monitoring unit 7.

The flow of the reboot process if a failure occurs in any of the independent processes 2a, 2b, and so on in the application subsystem 1 is described above.

The disclosure assumes that a failure that has occurred in one of the independent processes 2a, 2b, and so on can be recovered from the failure by rebooting the failure-occurring independent processes 2a, 2b, and so on.

As described above, with the image forming apparatus 20 according to the disclosure, for example, even if a failure occurs in the copy function, the failure does not affect the facsimile function. Rebooting only the independent process in charge of the copy function ensures recovery from the failure.

Flow of Processes 2

Figure 4:
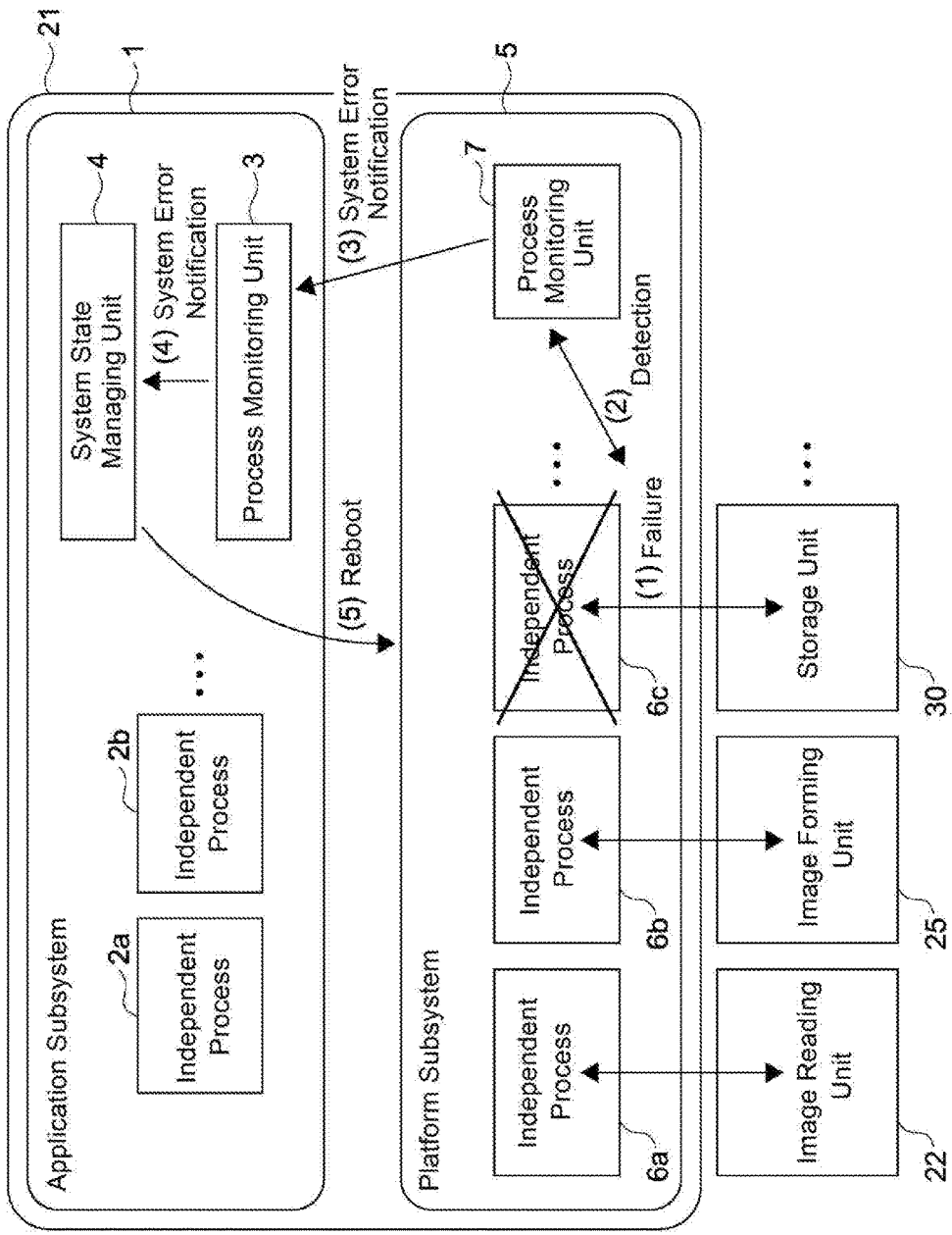
FIG. 4 illustrates a flow of a reboot process if a failure occurs in any of independent processes in a platform subsystem according to the first embodiment.

Next, the following describes the flow of the reboot process if the failure occurs in any of the independent processes 6a, 6b, 6c, and so on in the platform subsystem 5. FIG. 4 illustrates the flow of the reboot process if a failure occurs in any of the independent processes 6a, 6b, 6c, and so on in the platform subsystem 5 according to the first embodiment.

(1) First, assume that a failure occurs in the independent process 6c in the platform subsystem 5.

(2) Next, the process monitoring unit 7 detects the process-down of the independent process 6c.

(3) Next, the process monitoring unit 7 transmits the system error notification, which notifies the failure in the independent process 6c, to the process monitoring unit 3 in the application subsystem 1.

(4) Next, the process monitoring unit 3 transmits the system error notification, which notifies the failure in the independent process 6c, to the system state managing unit 4.

(5) Next, the system state managing unit 4 reboots the entire platform subsystem 5. The system state managing unit 4 may be configured to reboot the entire image forming apparatus 20.

If a failure occurs in any of the independent processes 6a, 6b, 6c, and so on, the entire operation of the platform subsystem 5 becomes unstable. Therefore, not the individual independent processes 6a, 6b, 6c, and so on in the platform subsystem 5 alone but the entire platform subsystem 5 is rebooted.

The flow of the reboot process if a failure occurs in any of the independent processes 6a, 6b, 6c, and so on in the platform subsystem 5 is described above.

Configuration of Image Forming Apparatus According to Second Embodiment

Figure 5:
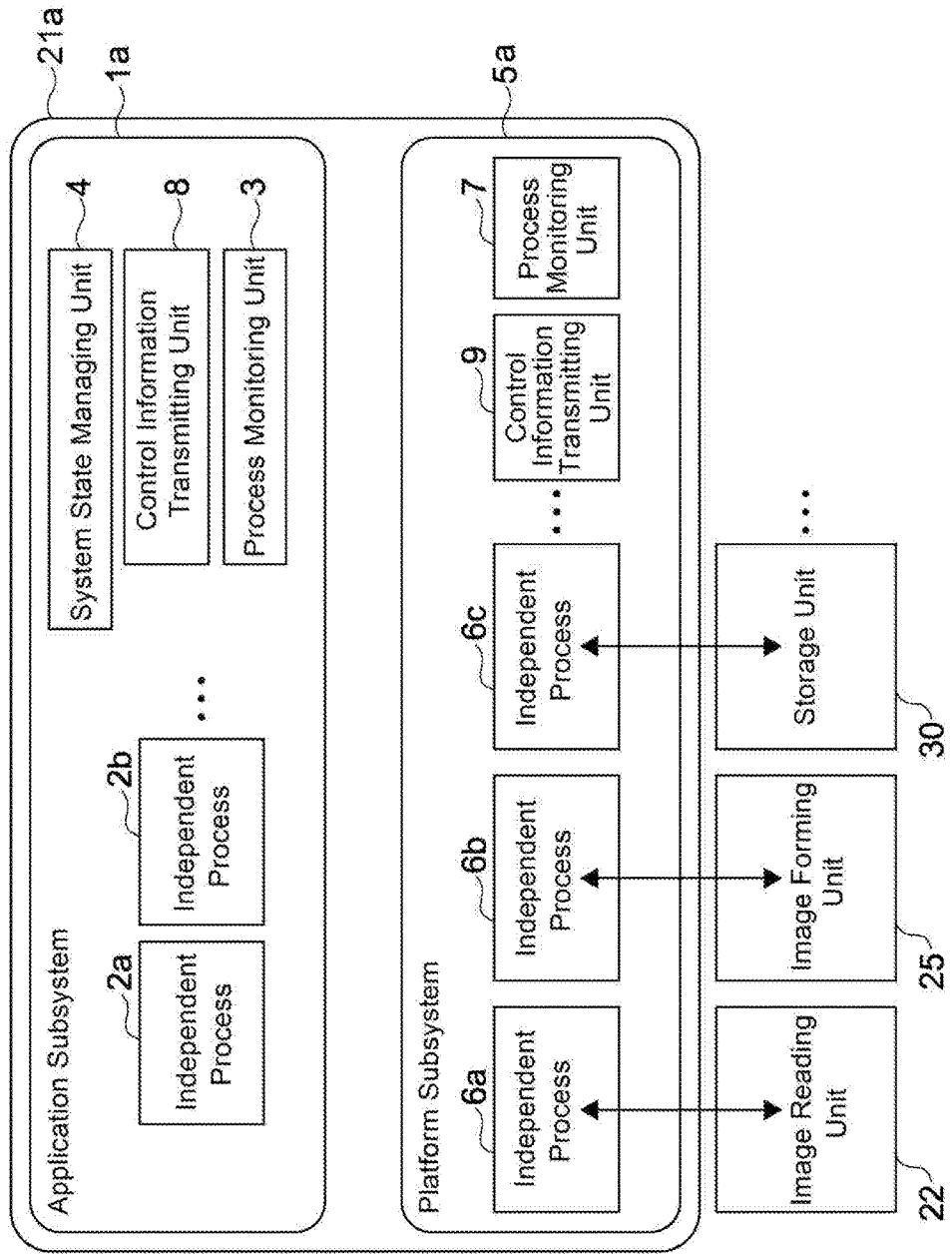
FIG. 5 illustrates a configuration of a control unit according to a second embodiment.

FIG. 5 illustrates a configuration of a control unit 21a according to a second embodiment. A control unit 21a according to the second embodiment differs from the control unit 21 according to the first embodiment in that the application subsystem 1 and the platform subsystem 5 are changed to an application subsystem 1a and a platform subsystem 5a, respectively. The application subsystem 1a further includes a control information transmitting unit (also referred to as a control information transmitting circuit) 8. The platform subsystem 5a includes a control information transmitting unit 9. The control information transmitting unit 8 and the control information transmitting unit 9 may include a processor including one or more circuits, can read and execute various programs, and can execute various programs preliminarily incorporated into the inside. Here, the circuit can be an electronic component where a plurality of electronic elements are connected with wiring or an electronic substrate.

In case of a failure in any of the independent processes 2a, 2b, and so on during process, the control information transmitting unit 8 obtains and holds control information required to resume the process from the independent process where the failure has occurred after the reboot to provide the control information to required portions at the resumption of the process.

In case of a failure in any of the independent processes 2a, 2b, and so on during process, the control information transmitting unit 9 obtains control information required after the reboot from the control information transmitting unit 8 and provides the obtained and held control information to required portions at the resumption of the process.

In the above-described description, for holding and transmitting the control information, the control information transmitting unit 8 and the control information transmitting unit 9 are provided. However, this should not be construed in a limiting sense. Both functions may be collected to one, and the one control information transmitting unit may be located in the application subsystem 1a or the platform subsystem 5a.

The control information transmitting unit collected to one may be configured to be independent of the application subsystem 1a and the platform subsystem 5a.

The configuration of the control unit 21a according to the second embodiment is described above.

Flow of Processes 3

Figure 6:
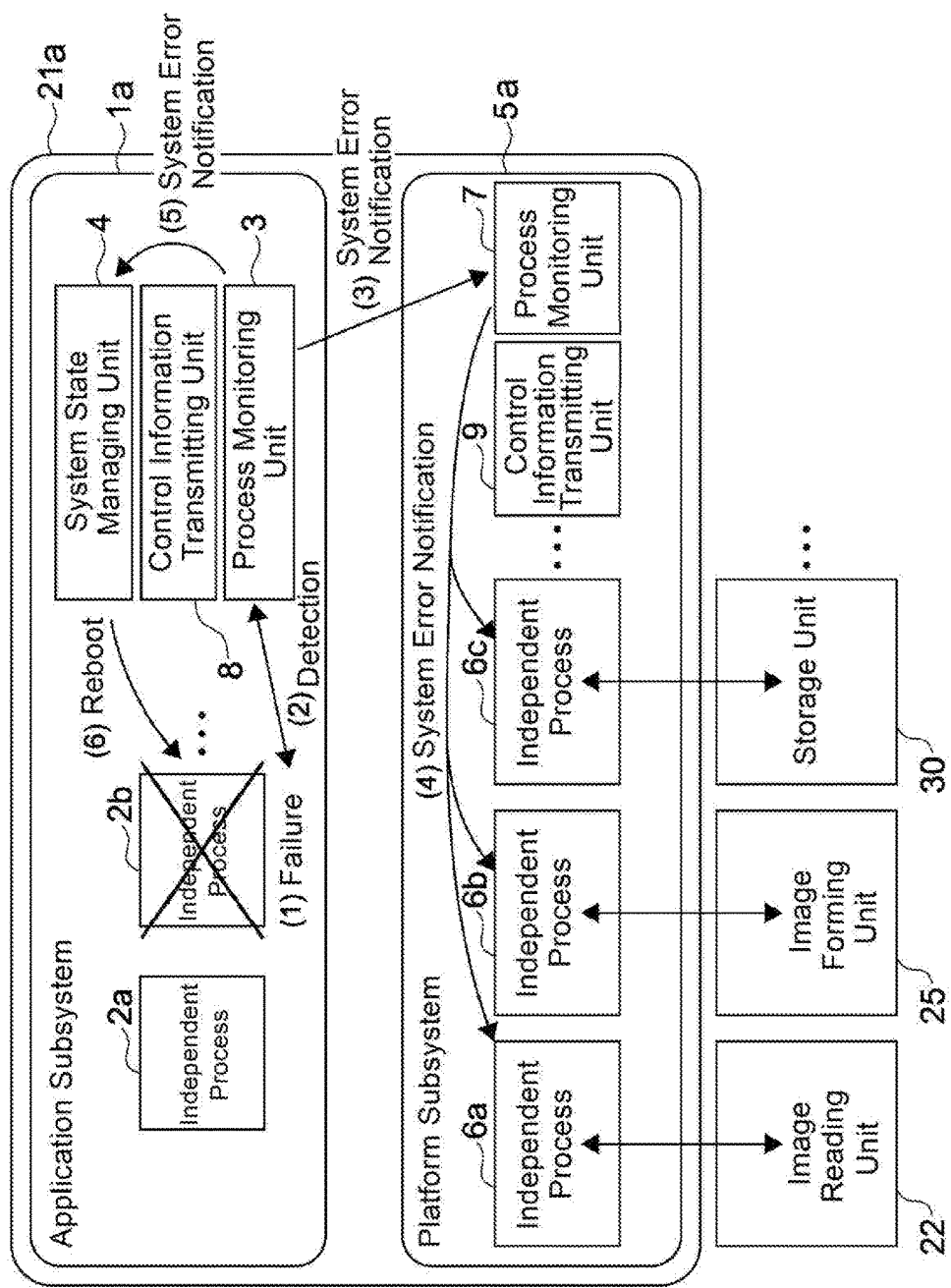
FIG. 6 illustrates a flow of a reboot process if a failure occurs in any of independent processes in an application subsystem according to the second embodiment.
Figure 7:
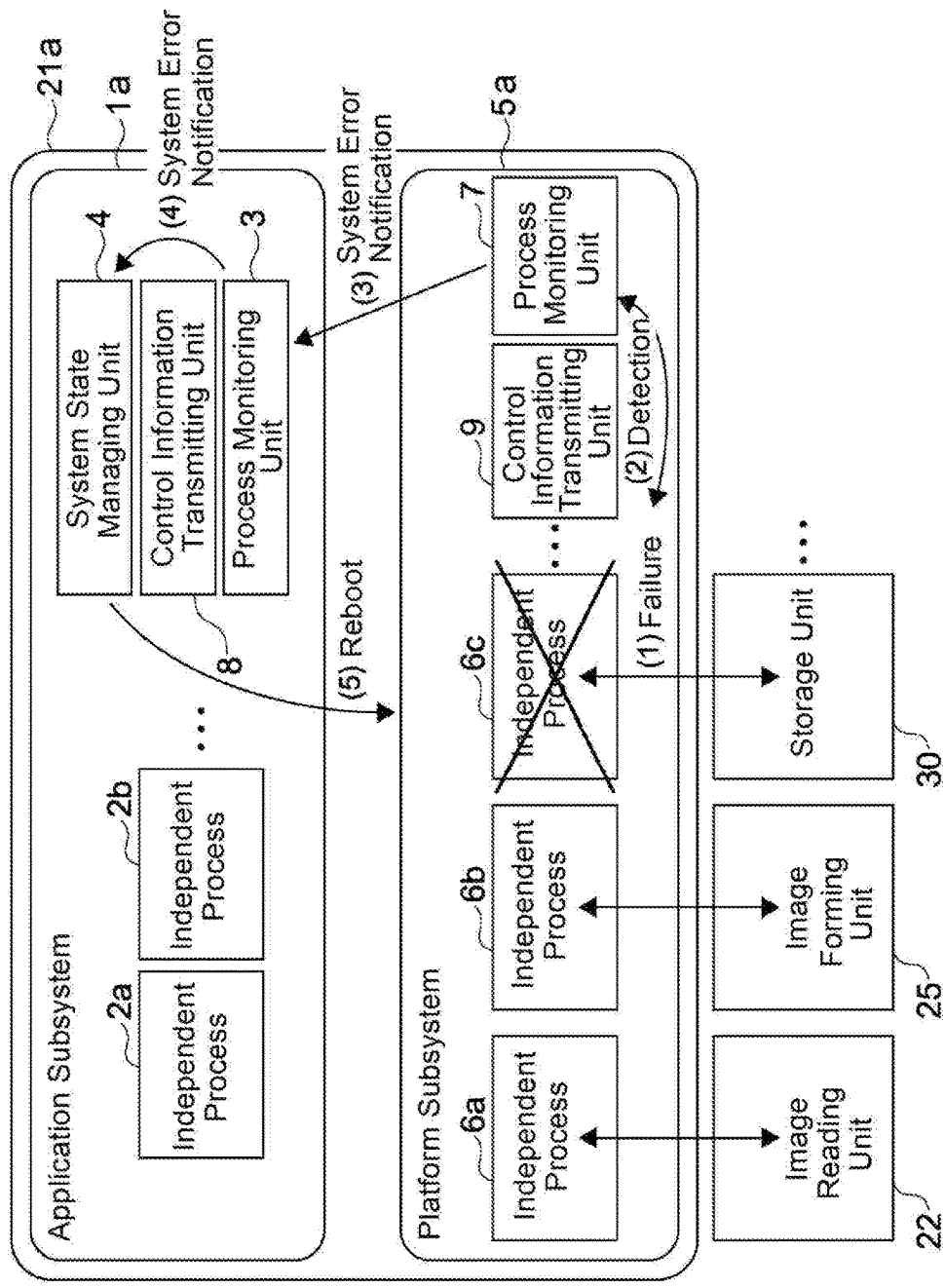
FIG. 7 illustrates a flow of a reboot process if a failure occurs in any of independent processes in a platform subsystem according to the second embodiment.

Next, the following describes the flow of the reboot process if a failure occurs in any of the independent processes 2a, 2b, and so on in the application subsystem 1a. FIG. 6 illustrates the flow of the reboot process if a failure occurs in any of the independent processes 2a, 2b, and so on in the application subsystem 1a according to the second embodiment. FIG. 7 illustrates a flow of a reboot process if a failure occurs in any of the independent processes 6a, 6b, 6c, and so on in the platform subsystem 5a.

Here, the following omits a description of a simple reboot process that does not affect a process during work even if the independent process in the application subsystem 1a in which the failure has occurred is rebooted. A complicated reboot process that affects another work will be described later.

Next, the following describes the complicated reboot process, which affects another work, when the independent process in the application subsystem 1a in which the failure has occurred is rebooted. FIGS. 8 to 11 illustrate the complicated reboot process, which affects another work, when the independent process in the application subsystem 1a in which the failure has occurred is rebooted.

Figure 8:
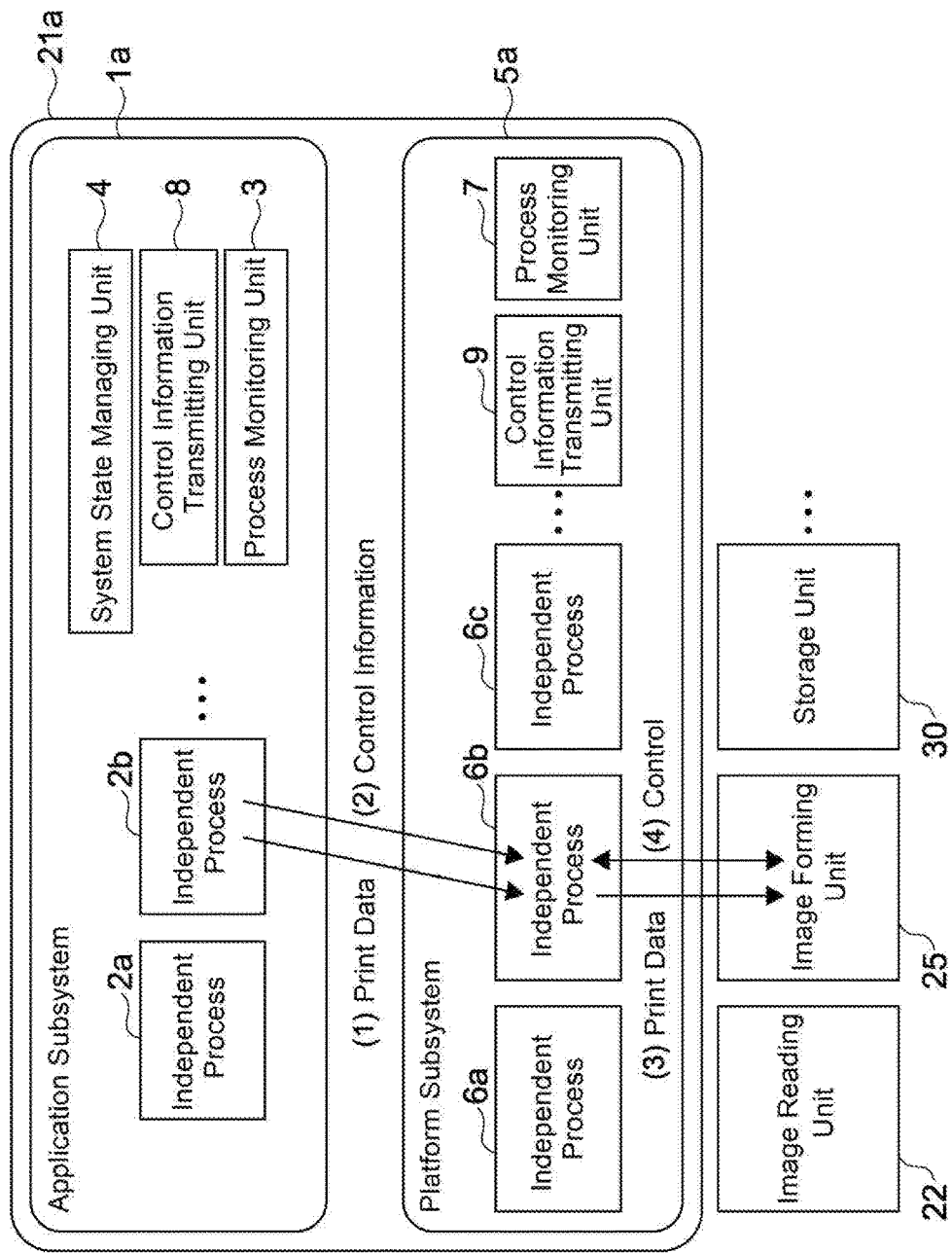
FIG. 8 illustrates a flow of processes before a failure occurs according to the second embodiment.

First, the following describes the flow of processes before a failure occurs. FIG. 8 illustrates the flow of processes before a failure occurs.

The following description assumes that the independent process 2b is a print application program that accepts an instruction from the user and prints a specified five-page document.

(1) and (2) First, the independent process 2b prepares the print data on the first page and the control information and transmits the data to the independent process 6b, which controls the image forming unit 25 (a first process). The control information transmitted here, for example, is information that indicates the document to be printed having five pages in total and the data currently transmitted being the first page.

(3) and (4) Next, the independent process 6b, which has received the print data on the first page and the control information, transmits the print data on the first page to the image forming unit 25 and controls the image forming unit 25 (a second process).

Similarly, assume that the independent process 2b completes the transmission of the print data up to the second page in the document and the control information and prepares for transmission of print data on the third page while the image forming unit 25 is printing the second page.

The flow of processes before the failure is described above.

Figure 9:
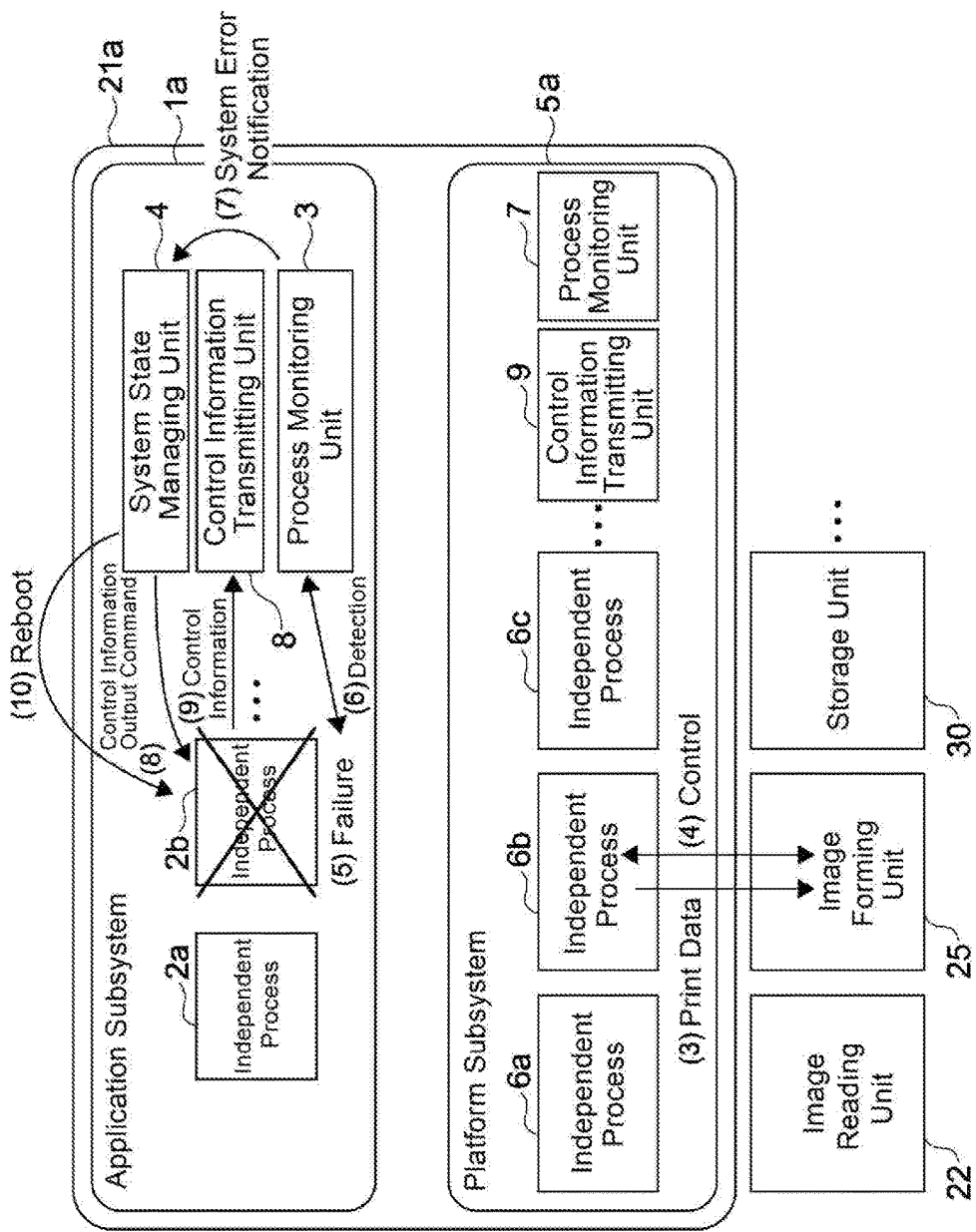
FIG. 9 illustrates a flow of processes from when a failure occurs until reboot according to the second embodiment.

Next, the following describes the flow of processes from when a failure occurs until the reboot. FIG. 9 illustrates the flow of processes from when the failure occurs until the reboot.

(3), (4) Before a failure occurs in the independent process 2b, the independent process 6b has already received the print data on the second page and the control information from the independent process 2b. Therefore, independent of the reboot process of the independent process 2b, a printing process on the second page is in progress.

(5) Assume that a failure occurs in the independent process 2b.

(6) The process monitoring unit 3 detects the failure in the independent process 2b.

(7) When the process monitoring unit 3 detects the failure, the process monitoring unit 3 transmits the system error notification, which notifies the failure in the independent process 2b, to the system state managing unit 4.

(8) The system state managing unit 4, which has received the system error notification, transmits an instruction to output the control information to the independent process 2b.

(9) The independent process 2b, which has received the output command of the control information, transmits the control information to the control information transmitting unit 8. Here, in the above-described example, the control information means information indicative of completion of transmission of print data up to the second page in the document having five pages in total.

(10) The system state managing unit 4 reboots the independent process 2b.

The flow of processes from when the failure occurs until the reboot is described above.

In the above-described description, by the control information output command from the system state managing unit 4, the independent process 2b transmits the control information to the control information transmitting unit 8. However, this should not be construed in a limiting sense. For example, due to the condition of the failure, if the independent process 2b cannot output the control information, the control information transmitting unit 8 may refer to a work area on the RAM used by the independent process 2b to actively obtain the control information.

Figure 10:
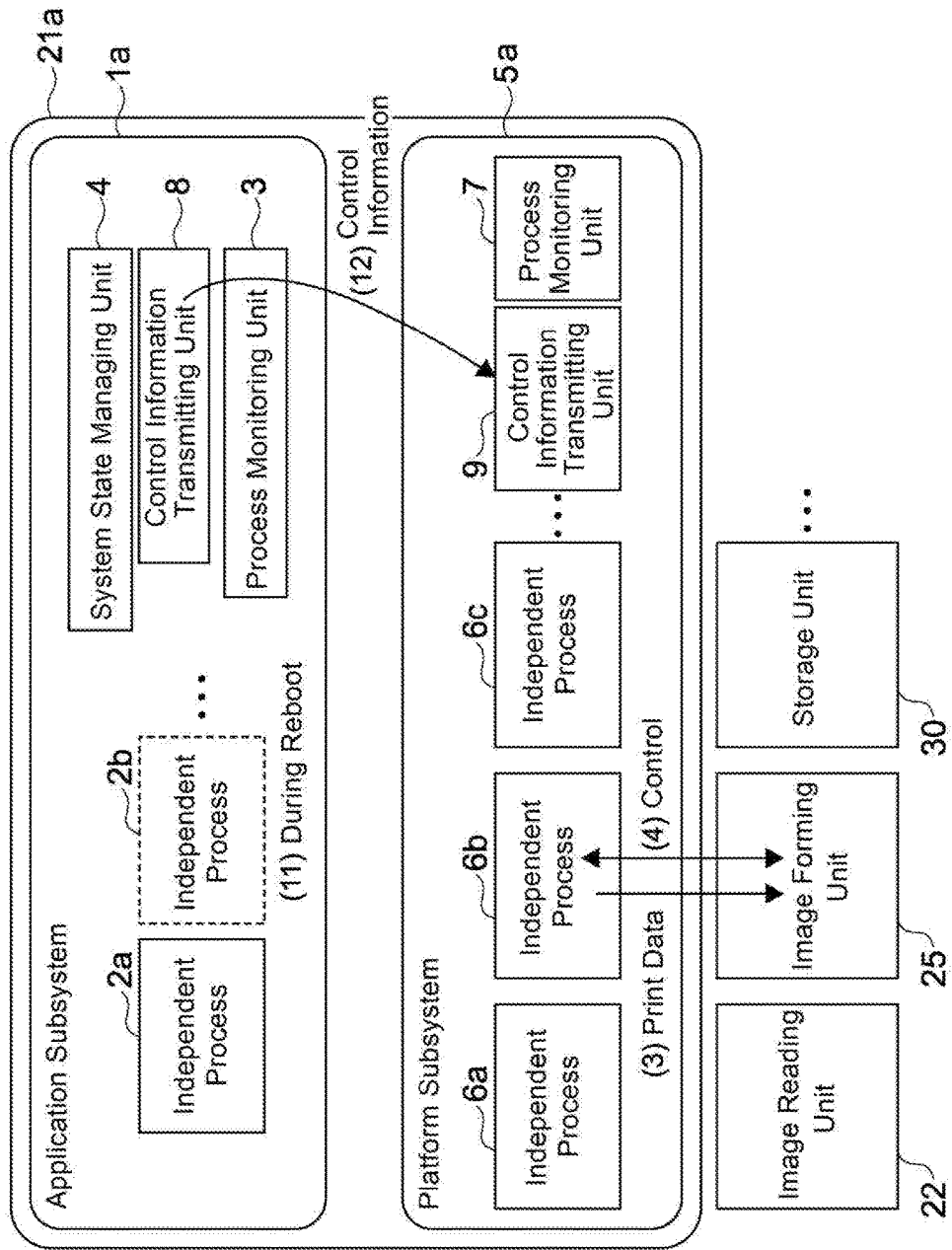
FIG. 10 illustrates a flow of processes during reboot according to the second embodiment.
Figure 11:
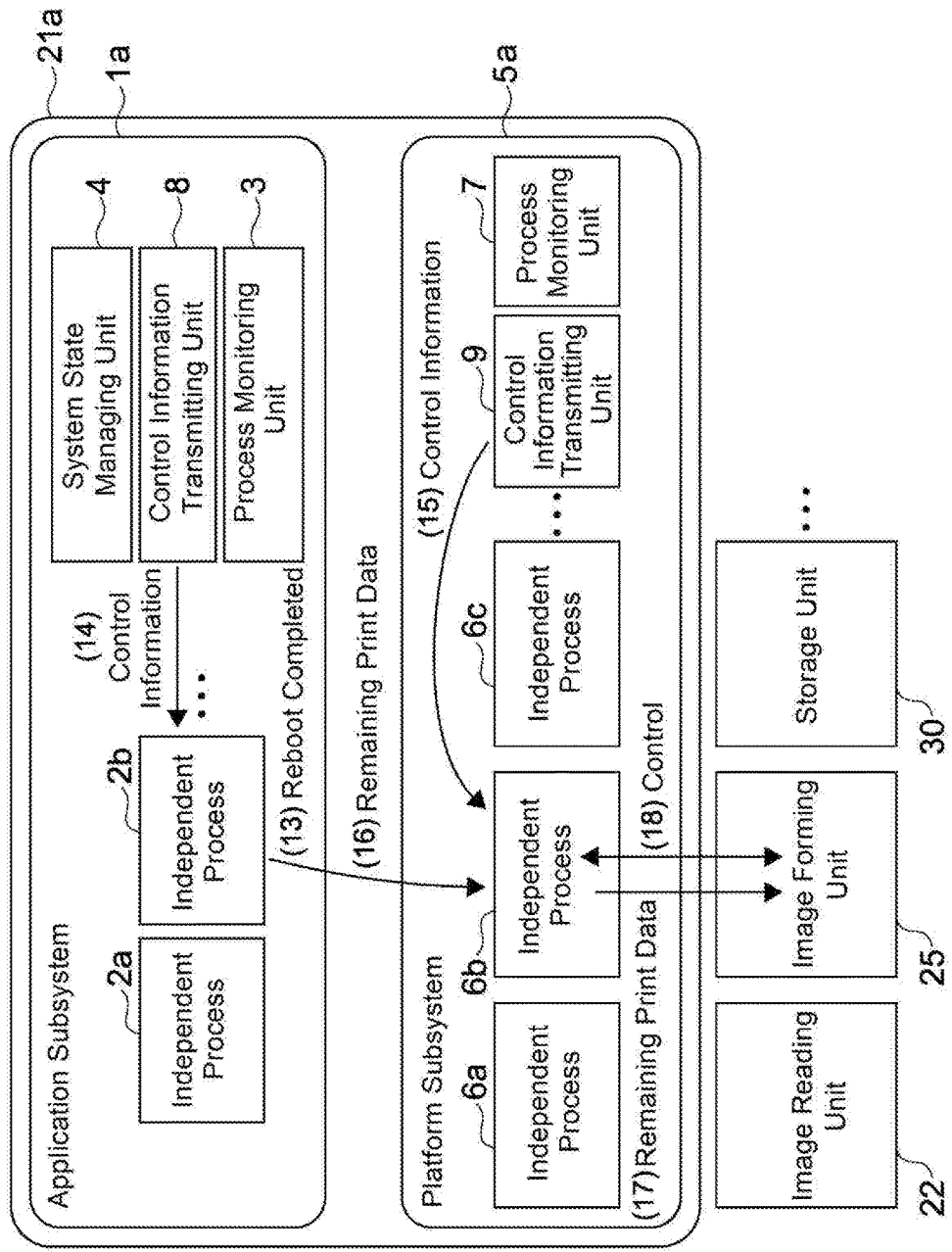
FIG. 11 illustrates a flow of processes until the process is resumed after the reboot according to the second embodiment.

Next, the following describes the flow of processes during reboot. FIG. 10 illustrates the flow of processes during reboot.

(11) The independent process 2b is during reboot.

In the processes (3) and (4) where the independent process 6b controls the image forming unit 25 to print the print data on the second page, the application subsystem 1a and the platform subsystem 5a are independent of each other; therefore, even during rebooting the independent process 2b, the processes (3) and (4) can be continued.

(12) The control information transmitting unit 8 transmits the control information received from the independent process 2b to resume the processes after reboot to the control information transmitting unit 9 in the platform subsystem 5a. It is only necessary that the control information be transmitted to the control information transmitting unit 9 until the resumption of processes after the reboot. The control information may be transmitted at a timing other than during reboot of the independent process 2b.

The flow of processes during reboot is described above.

Next, the following describes the flow of processes after the reboot until the process is resumed. FIG. 10 illustrates the flow of processes after the reboot until the process is resumed.

(13) First, the reboot of the independent process 2b is completed.

(14) When the reboot is completed, to know the condition of the process that the independent process 2b itself has performed halfway, the independent process 2b queries the control information transmitting unit 8 to obtain the control information held by the control information transmitting unit 8.

By obtaining the control information from the control information transmitting unit 8, the independent process 2b knows that the transmission of the print data has completed up to the second page in the document having five pages in total; therefore, the transmission should be resumed from the third page next. Thus, the independent process 2b resumes the transmission.

(15) To prepare for the resumption of the process also by the platform subsystem 5a side, the control information transmitting unit 9 transmits the control information received from the control information transmitting unit 8 and held to the independent process 6b.

(16) The independent process 6b refers to the control information received from the control information transmitting unit 9 and recognizes that the print data received from the independent process 2b is the remaining print data of the document printed halfway.

(17) and (18) The independent process 6b regards the print data received from the independent process 2b as print data continuous from the second page, which has already been printed, and transmits the print data to the image forming unit 25, thus controlling printing.

The flow of processes after the reboot until the process is resumed is described above.

The complicated reboot process that affects another work when the independent process in the application subsystem 1a in which the failure has occurred is rebooted is described above. For example, when the electronic device is an image forming device (MFP, multifunction peripheral), even if the image forming device is rebooted during print output, this ensures reducing a paper jam caused by a stop of printing paper sheet in the middle. Thus, this embodiment ensures providing the electronic device and the reboot program that ensure appropriately resuming the process that has been in execution.

Configuration of Image Forming Apparatus According to Third Embodiment

Figure 12:
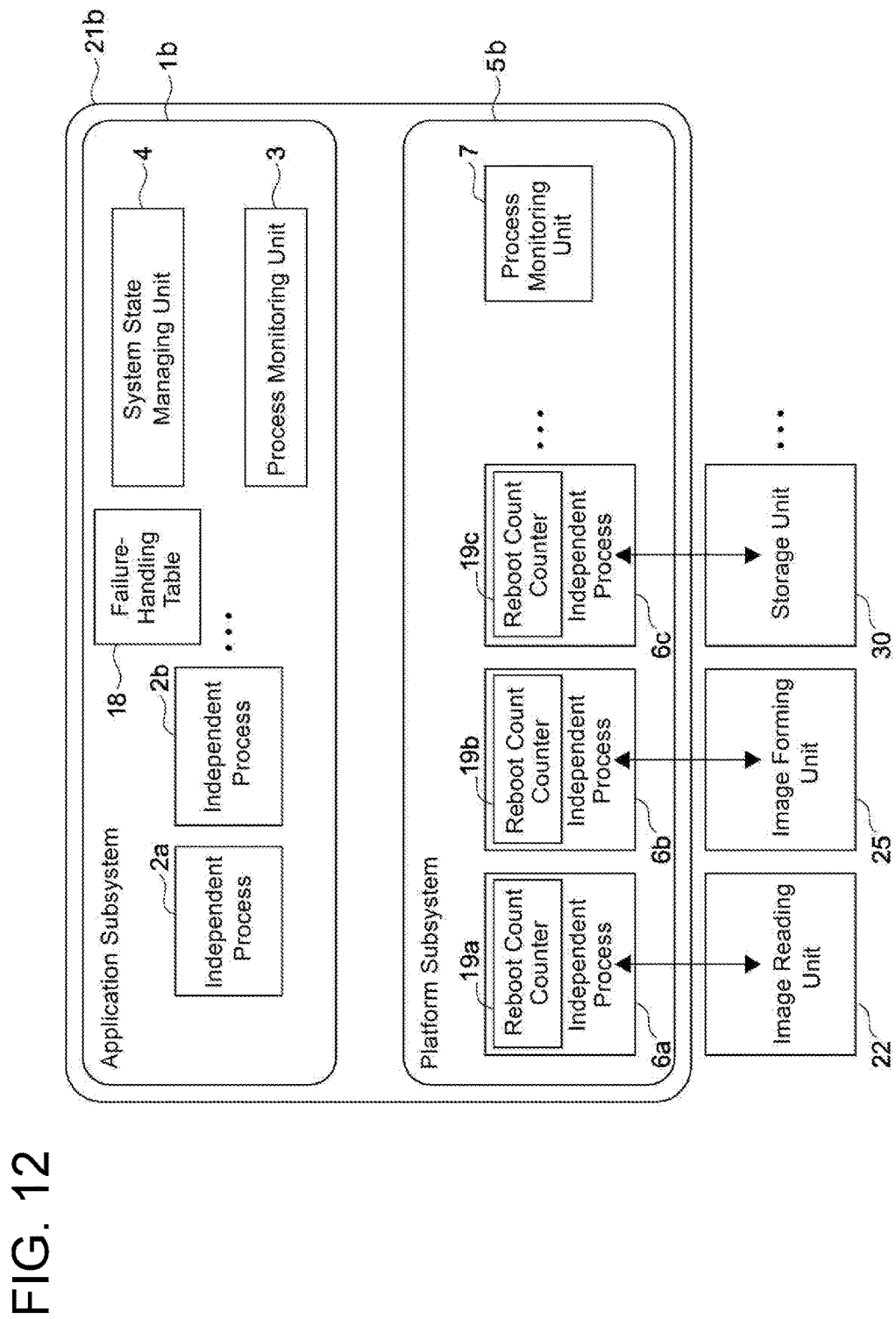
FIG. 12 illustrates a configuration of a control unit according to a third embodiment.
Figure 13:
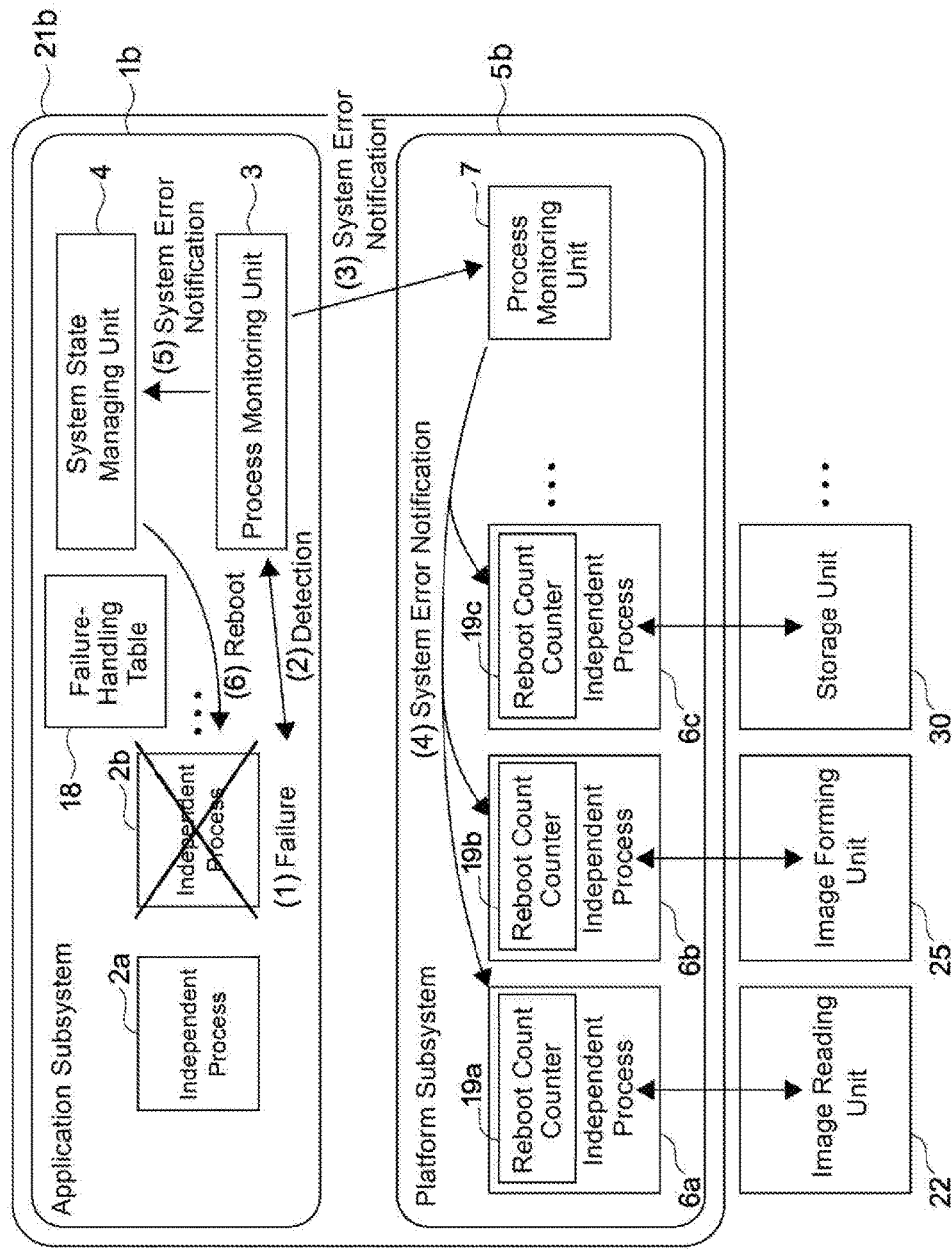
FIG. 13 illustrates a flow of a reboot process if a failure occurs in any of independent processes in an application subsystem according to the third embodiment.
Figure 14:
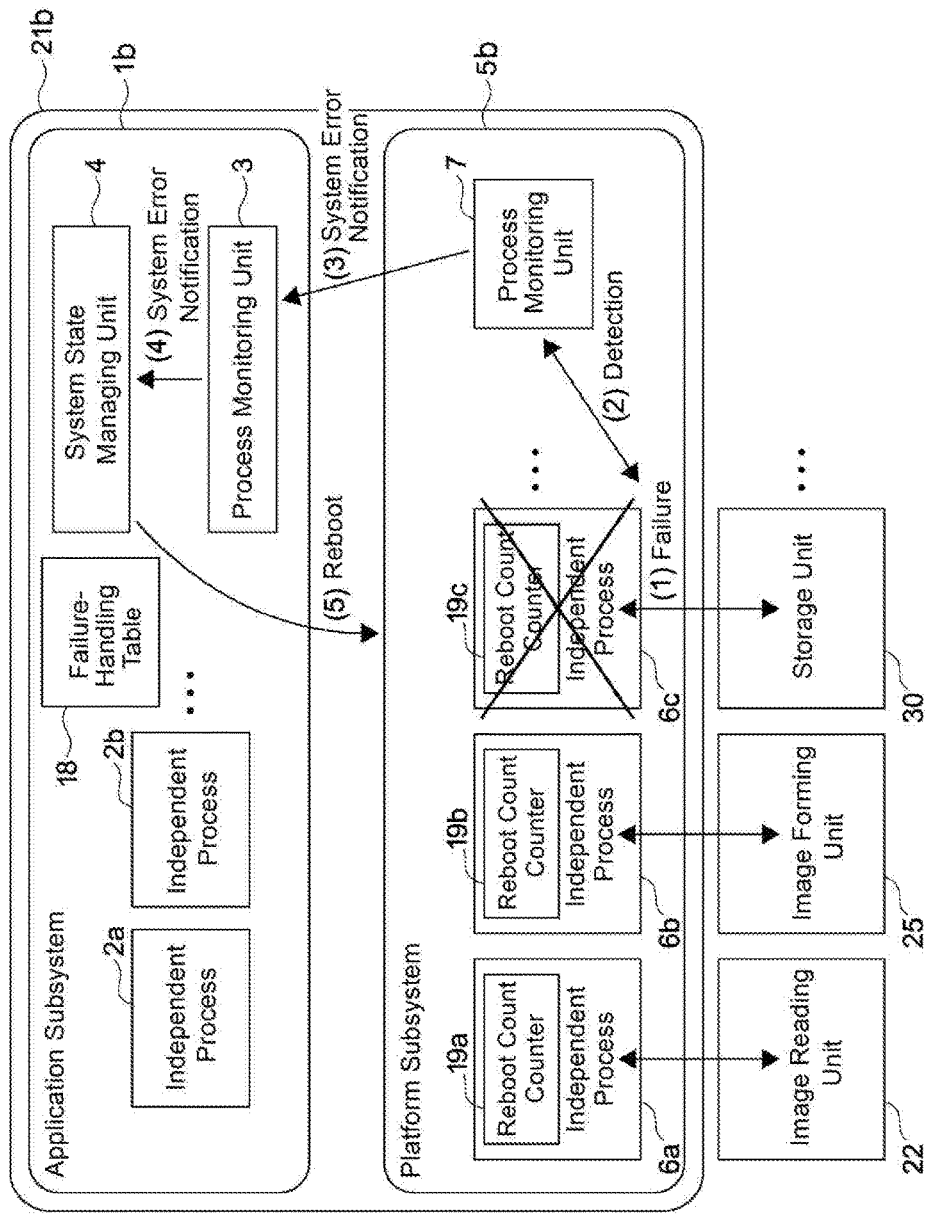
FIG. 14 illustrates a flow of a reboot process if a failure occurs in any of independent processes in a platform subsystem according to the third embodiment.

FIG. 12 illustrates a configuration of a control unit 21b according to a third embodiment. FIG. 13 illustrates a flow of a reboot process if a failure occurs in any of the independent processes 2a, 2b, and so on in an application subsystem 1b. FIG. 14 illustrates a flow of the reboot process if a failure occurs in any of independent processes 6a, 6b, 6c, and so on in a platform subsystem 5b. The control unit 21b according to the third embodiment differs from the control unit 21 according to the first embodiment in that the application subsystem 1 and the platform subsystem 5 are changed to an application subsystem 1b and a platform subsystem 5b, respectively. The application subsystem 1b further includes a failure-handling table 18. In the platform subsystem 5b, the independent processes 6a, 6b, 6c, and so on each include reboot count counters 19a, 19b, 19c, and so on.

The failure-handling table 18 is to control the number of reboots of the platform subsystem 5b by the system state managing unit 4 for recovery from the failure occurred in the platform subsystem 5b. The details will be described later.

If a failure occurs in any of the independent processes 6a, 6b, 6c, and so on or hardware controlled by the independent processes 6a, 6b, 6c, and so on and therefore any of the independent processes 6a, 6b, 6c, and so on goes down (the process-down), the reboot count counters 19a, 19b, 19c, and so on count the number of reboots of the platform subsystem 5b attempted for recovery. The configuration of the control unit 21b according to the third embodiment is described above.

Distinction of Causes of Failures Based on Number of Reboots and Handling of Failures Next, the following describes a distinction of causes of failures based on the number of reboots and handlings against the failures if a process-down occurs in the independent processes 6a, 6b, 6c, and so on in the platform subsystem 5b. FIG. 15 illustrates an example of the failure-handling table 18 used for the distinction of causes of failures based on the number of reboots and the handling of the failures if the process-down occurs in the independent processes 6a, 6b, 6c, and so on in the platform subsystem 5b.

For example, the independent process 6a is a process of controlling the image reading unit 22, which is hardware. If a failure occurs in the independent process 6a or the image reading unit 22, the process monitoring unit 7 detects the failure as the process-down of the independent process 6a.

The process monitoring unit 7, which has detected the process-down of the independent process 6a, notifies the system state managing unit 4 of the system error notification.

The system state managing unit 4 refers to the failure-handling table 18 and the reboot count counter 19a and determines that the process of the first recovery process when the independent process 6a goes to the process-down is reboot.

The system state managing unit 4 performs the first reboot of the platform subsystem 5b. The reboot count counter 19a counts up the number of reboots.

When the independent process 6a recovers after the reboot, the system state managing unit 4 determines that the occurred failure is a software failure caused by the independent process 6a. Since the recovery has been completed, additional handling of the failure is not performed. The reboot count counter 19a is reset.

If the independent process 6a does not recover after the reboot, the system state managing unit 4 refers to the failure-handling table 18 and the reboot count counter 19a again and reboots the platform subsystem 5b as the second recovery process.

If the independent process 6a does not recover even after the second reboot, the system state managing unit 4 refers to the failure-handling table 18 and the reboot count counter 19a and performs the third reboot.

If the independent process 6a does not recover even after the third reboot, the system state managing unit 4 refers to the failure-handling table 18 and the reboot count counter 19a. Then, the system state managing unit 4 determines that the failure, which occurs in the independent process 6a, is not a failure of the independent process 6a itself, which is high probability of being recovered by reboot, but is caused by the image reading unit 22, which is hardware, where a probability of recovery by reboot is low.

The system state managing unit 4, which has determined that the failure is in the hardware, stops the control to the image reading unit 22 to separate the image reading unit 22 from the control target.

The system state managing unit 4 notifies the respective independent processes in the application subsystem 1b and the platform subsystem 5b of the unusable state of the image reading unit 22.

The respective independent processes that have received the notification regard that the image reading unit 22 is absent and provides the user with only functions independent from the image reading unit 22 so as not to prevent errors caused by the absence of the image reading unit 22.

Thus, the failure-handling table 18 is used a criterion to determine that: when the system recovers from a failure until execution of the specific number of reboots, the failure is caused by the software; and if the system does not recover from a failure even after execution of the specific number of reboots, the failure is caused by the hardware. Additionally, the failure-handling table 18 predetermines the recovery method, which is selected depending on the number of reboots.

The setting contents of the failure-handling table, which is illustrated as an example in FIG. 15, and the processes performed based on the setting contents when the independent process 6a goes to the process-down are described above.

According to properties of the hardware and properties of the independent processes controlling the hardware, the number of reboots that should be performed to distinguish the causes of the failures is different. The probability of recovery by reboot may be preliminary measured, and based on the measurement result, the number of reboots for the recovery process may be determined.

That is, for example, due to a reason such as the complicated structure, the probability of recovery of the independent process 6a by reboot is low. Therefore, until the reboot is performed three times, the cause of the failure cannot be determined in the hardware.

In contrast to this, the independent process 6c, which controls the storage unit 30, due to its simple structure or a similar reason, the probability of recovery of the independent process 6c by reboot is high. Therefore, if the system cannot recover after the one-time reboot, it can be determined that the cause of the failure is the hardware.

The distinction of the causes of failures based on the number of reboots and the handling of the failures if the process-down occurs in the independent processes 6a, 6b, 6c, and so on in the platform subsystem 5b are described above.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An electronic device, comprising hardware components executing functions of the electronic device, and microprocessor circuitry configured to operate as:
an application subsystem that includes
one or more first independent processes that provide a user with different functions of the electronic device,
a first process monitoring circuit that detects a first handling-required state of the first independent processes, and
a system state managing circuit that reboots a first independent process in which the handling-required state has occurred; and
a platform subsystem that controls one or more of the hardware components of the electronic device, and that includes
one or more second independent processes that control respective ones of the hardware components of the electronic device, and
a second process monitoring circuit that detects a second handling-required state of the second independent processes; wherein
the first independent processes utilize the second independent processes to provide specified functions to a user;
when the first handling-required state occurs in one of the first independent processes,
(i) the first process monitoring circuit having detected the first handling-required state transmits an error notification to the system state managing circuit, and
(ii) the system state managing circuit having received the error notification reboots the first independent process in which the first handling-required state has occurred, without rebooting the second independent processes; and
when the second handling-required state occurs in one of the second independent processes,
(i) the second process monitoring circuit having detected the second handling-required state transmits the error notification to the system state managing circuit, and
(ii) the system state managing circuit having received the error notification reboots the platform subsystem, without rebooting the first independent processes.

2. The electronic device according to claim 1, wherein:
when the first handling-required state occurs in one of the first independent processes, (i) the first process monitoring circuit that has detected the first handling-required state transmits the error notification to the second process monitoring circuit, (ii) the second process monitoring circuit having received the error notification transmits the error notification to the respective second independent processes, and (iii) the respective second independent processes having received the error notification refrain, for a specific period, communications to the first independent process in which the first handling-required state has occurred.

3. The electronic device according to claim 1, wherein:
the platform subsystem includes a control information transmitting circuit that holds control information, the control information being used to resume a first process after a reboot of the first independent process in which the first handling-required state has occurred, the first process having been performed by the first independent process in which the first handling-required state has occurred and being suspended due to the occurrence of the first handling-required state;
the application subsystem executes the first independent processes;
when the first handling-required state occurs in one of the first independent processes performing the first process, (i) the first process monitoring circuit that has detected the first handling-required state transmits the error notification to the system state managing circuit, (ii) the control information transmitting circuit obtains the control information based on an instruction by the system state managing circuit having received the error notification, (iii) the system state managing circuit having received the error notification reboots the first independent process in which the first handling-required state has occurred, and (iv) the rebooted first independent process obtains the control information from the control information transmitting circuit to resume the first process based on the obtained control information.

4. The electronic device according to claim 3, wherein:
the platform subsystem executes one or more second independent processes that control the respective hardware components of the electronic device;
when the first process is resumed, (i) the control information transmitting circuit transmits the control information to a second independent process that has performed a second process related to the first process, and (ii) the second independent process having received the control information resumes the second process based on the received control information.

5. The electronic device according to claim 1, wherein:
the platform subsystem includes a counter that counts a count of reboots until recovery; and
based on the count of reboots until the recovery counted by the counter, the system state managing circuit determines whether the second handling-required state is caused by a second independent process or is caused by the hardware component controlled by the second independent process.

6. The electronic device according to claim 5, further comprising:
a failure-handling table that has, for each of the second independent processes, determined the count of reboots of the platform subsystem, a criterion for determination, and a recovery method, the criterion for determination being to determine whether the second handling-required state is caused by the second independent process or is caused by the hardware component controlled by the second independent process, the recovery method being provided depending on the count of reboots; wherein
the system state managing circuit selects a distinction of the cause of the second handling-required state and the recovery method based on the failure-handling table.

7. The electronic device according to claim 5, wherein when the system state managing circuit determines that the cause of the second handling-required state is the hardware component controlled by the second independent process, the system state managing circuit causes the second independent process to stop controlling the hardware component that has caused the second handling-required state.

8. The electronic device according to claim 7, wherein when the system state managing circuit determines that the cause of the second handling-required state is the hardware component controlled by the second independent process, the system state managing circuit notifies the application subsystem and the second independent process that use of the hardware component that has caused the second handling-required state is to be avoided.

9. A non-transitory computer-readable recording medium storing a reboot program to control an electronic device comprising hardware components executing functions of the electronic device, and microprocessor circuitry, the reboot program causing the microprocessor circuitry to operate as:
an application subsystem that includes
one or more first independent processes that provide a user with different functions of the electronic device,
a first process monitoring circuit that detects a first handling-required state of the first independent processes, and
a system state managing circuit that reboots a first independent process in which the handling-required state has occurred; and
a platform subsystem that controls one or more of the hardware components of the electronic device, and that includes
one or more second independent processes that control respective ones of the hardware components of the electronic device, and
a second process monitoring circuit that detects a second handling-required state of the second independent processes; wherein
the first independent processes utilize the second independent processes to provide specified functions to a user;
when the first handling-required state occurs in one of the first independent processes,
(i) the first process monitoring circuit having detected the first handling-required state transmits an error notification to the system state managing circuit, and
(ii) the system state managing circuit having received the error notification reboots the first independent process in which the first handling-required state has occurred, without rebooting the second independent processes; and
when the second handling-required state occurs in one of the second independent processes,
(i) the second process monitoring circuit having detected the second handling-required state transmits the error notification to the system state managing circuit, and
(ii) the system state managing circuit having received the error notification reboots the platform subsystem, without rebooting the first independent processes.

* * * * *